Patented May 16, 1950

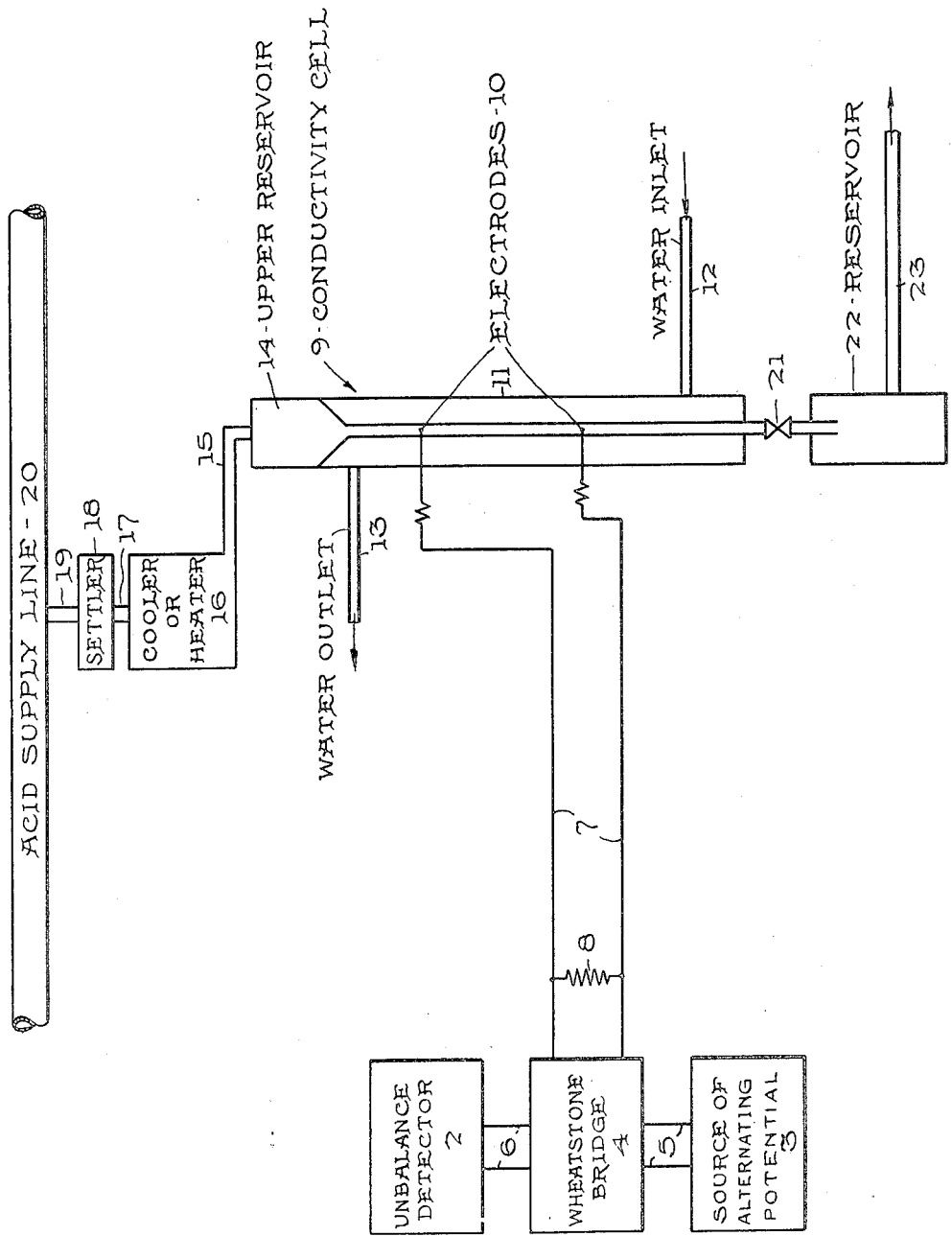

2,507,645

UNITED STATES PATENT OFFICE 2,507,645

METHOD FOR THE ELECTRICAL DETERMINATION OF SULFURIC ACID CONCENTRATION

Robert Elmo Price, Port Arthur, Tex., assignor to Gulf Oil Corporation, Pittsburgh, Pa., a corporation of Pennsylvania Application May 16, 1946, Serial No. 670,065

4 Claims. (Cl. 175—183)

This invention relates to a method for the electrical determination of sulfuric acid concentration and more particularly to a method for determining the concentration of sulfuric acid in "black" acid by electrical conductance measurements.

In hydrocarbon treating processes using sulfuric acid, it is desirable that the concentration of the acid be known at various stages of such processes. Likewise, in facilities devoted to purification and concentration of used acid frequent determinations of intermediate and final acid concentration are necessary for efficient operation. Conventional methods for determining the concentration of sulfuric acid include specific gravity measurements, titration with standard alkaline solutions, and measurement of the heat of dilution. However, only titration gives reproducible results of high accuracy and for plant control purposes, it is desirable to determine the concentration of sulfuric acid by a method which can be more rapidly and more efficiently carried out.

An additional method of determining the concentration of sulfuric acid has been the measurement of the specific conductance of the acid. However, because of the nature of the sulfuric acid arising from contact with hydrocarbons in hydrocarbon treating processes, the specific conductance method has heretofore been inapplicable. Such sulfuric acid arising in hydrocarbon treating processes is called "black" acid. Black acid is usually purified and concentrated from the partially spent and contaminated sulfuric acid arising from various refinery processes, including alkylation of light hydrocarbons and treatment of various gasoline, naphtha, kerosene, furnace oil, and lubricating oil stocks, and is then suitable for reuse in the various processes. Impurities remaining after the purification and concentration of the acid comprise principally carbonaceous material with minor quantities of sodium sulfate and other inorganic compounds. For a concentrated and purified black acid of 95–99% $H_2SO_4$, the total quantity of such impurities usually comprises about 0.5–1.5% by weight of the acid. These impurities make unsuitable the application of known specific conductance methods to the determination of the concentration of sulfuric acid in black acid because the conductivity electrodes in the ordinary conductivity cell are polarized and poisoned by the impurities. Polarization and poisoning of the electrodes make impossible the obtaining of reproducible and accurate results.

It is an object of this invention to determine the concentration of sulfuric acid by a method which will give reproducible results rapidly and efficiently.

It is a specific object of this invention to determine by conductivity means the concentration of sulfuric acid in black acid.

These and other objects are achieved by the present invention wherein the concentration of sulfuric acid in black acid is determined by measuring the specific conductance of said black acid between metal electrodes at a non-polarizing frequency of the alternating current employed in making the conductance determination. Since the specific conductance is a function of the concentration of the acid, variations of such conductance will correspond to varying concentrations of the acid, provided the temperature remains substantially constant, as pointed out below. Specifically, it has been found that if a source of alternating current having the proper frequency is impressed on the conductivity cell, polarization and poisoning of the electrodes will not take place. If copper electrodes are used in the conductivity cell, the source of alternating current should have a minimum frequency of 60 cycles per second. If tungsten, iron or noble metal, such as platinum, gold or silver, electrodes are used, the source of alternating current should have a minimum frequency of 400 cycles per second. It is preferred to use tungsten when a glass conductivity cell is employed because of its high melting point and its adaptability for fusion to Pyrex glass.

It is a feature of this invention that the electrodes are not required to be coated with a depolarizing film in order to minimize polarization. In conventional processes for determining conductance, as for example where platinum electrodes are employed, it is necessary to deposit on the surface of the platinum electrodes a film of platinum black. The deposited film of platinum black is absorbent, absorbs the thin film of gases formed which would otherwise polarize the electrodes, and thus depolarizes the electrodes. However, in my invention, when the proper non-polarizing frequency is employed in making the conductance determinations, it is unnecessary to provide such a depolarizing film on the electrodes. When operating in accordance with my invention, polarization of the electrodes will not occur regardless of the absence of a depolarizing film thereon.

In measuring the conductance of black acid, the temperature of the acid may be at any suitable point, and a temperature within a range of from 50 to 120° F. has been found satisfactory. A temperature of 110° F. is preferable for facility of temperature control. The specific temperature at which conductance measurements are made is not critical, but since the conductance of black acid of any specific concentration of $H_2SO_4$ will vary with temperature, it is desirable in making measurements to maintain any chosen temperature constant within about plus or minus 1° F.

The amount of carbonaceous impurities contained in the black acid also has an effect on the conductance of the black acid. It has been found that the specific conductance will vary with variations in the amount of carbonaceous material contained in the black acid. Therefore, in order to obtain reproducible and accurate results, it is desirable to determine the amount of carbonaceous materials and to calibrate the conductance readings accordingly. However, it has been found that acid from any given manufacturing process will not vary appreciably in carbonaceous impurities regardless of variations in sulfuric acid content. Therefore, it is necessary to determine the amount of carbonaceous impurities only once; and thereafter, it is possible to measure the specific conductance of acid from the same source using a constant value for the impurities.

The invention will be better understood by reference to the attached diagrammatic drawing.

In the figure, a typical glass conductivity cell 9 the connections of which are shunted with appropriate resistance 8 forms one leg of the circuit for a conventional Wheatstone bridge 4. This resistance 8 is helpful in minimizing polarization due to the fact that the electrical current flow through the cell is reduced. Alternating potential is applied to the bridge 4 from a convenient source 3 which is capable for producing frequencies in the audible range, with a minimum of 60 cycles per second when using copper electrodes in the conductivity cell 9 or a minimum of 400 cycles per second when using for example, platinum or tungsten electrodes. The source employed may be an electronic oscillator type, a mechanical vibrator type, or a rotary alternator type, which is capable of supplying potential up to 10 or 12 volts. Higher voltages may be used but offer no advantage. The unbalance detector 2 may be a telephone receiver, an alternating current galvanometer, or preferably an electronic voltmeter, or other suitable means. Within the conductivity cell 9 there is an inner glass tube of any suitable cross-sectional area, such as about 10 mm. in diameter, and approximately 650 mm. in length in which two electrodes 10 of suitable metal, such as copper, platinum or tungsten, are inserted and sealed by means of cement or, preferably, by fusion of the glass around the entrance holes. The electrodes are spaced about 300 mm. apart, which spacing may be varied in known manner in order to provide a satisfactory conductivity path. The inner tube is surrounded by an outer tube 11 of any convenient size which serves as a jacket for the inner tube in order that a circulating water stream or other suitable fluid may be employed for the purpose of maintaining a constant and predetermined temperature within the inner tube. Water, or other convenient fluid, is circulated through the outer jacket by means of inlet connection 12 and outlet connection 13. Any other suitable means for maintaining a constant temperature may be employed. The upper portion of the inner tube terminates in a funnel-shaped section which is fused to the inner wall of the outer tube, the funnel-shaped section serving as a small upper reservoir 14 for the inner tube and as the upper terminus for the outer tube. The upper reservoir 14 is connected to a cooler or heater 16 by means of conduit 15. The cooler or heater may be of any conventional design, such as a coil immersed in a water or steam bath. The cooler or heater 16 is connected to settler 18 by means of conduit 17. The settler comprises any suitable apparatus, such as a baffled box, designed to settle relatively large solid particles from the incoming acid stream which is introduced through conduit 19. The black acid originates from a supply line 20 which may be connected to the outlet of an acid purification and concentration plant, or a supply line to an acid treating operation, or an effluent line from a treating or catalytic process utilizing acid.

In operation, acid from any desired source flowing through conduit 20 is introduced to settler 18 by means of conduit 19. Settler 18 may be omitted in the case of relatively clean acid streams which are entirely free of relatively large solid material which would tend to clog or plug the apparatus. The acid flows from the settler through cooler or heater 16 by means of conduits 17 and 15 and is heated or cooled in order to obtain the temperature desired for determination of specific conductance and concentration. A temperature range of 50 to 120° F. is satisfactory, although a temperature of about 110° F. is preferable for facility of temperature control. From cooler or heater 16, the acid flows through conduit 15 into conductivity cell 9. If it is desired to obtain only spot checks of the concentration of the acid from source 20, or if it is desired to determine the concentration on any one sample, valve 21 is closed after filling the inner tube of the cell to a height above the top electrode and the acid concentration determination completed as described below. If it is desired to obtain continuous determination of the concentration of the acid from source 20, or to utilize the apparatus as a continuous recorder or a control mechanism, valve 21 is kept open allowing a continuous sample to flow through conductivity cell 9, the acid flowing into lower reservoir 22 and overflowing through conduit 23 to any desired disposition. Resistance to alternating current flow between the two electrodes interposed in the acid column within conductivity cell 9 is transmitted to the Wheatstone bridge 4 by means of leads 7. The variable slide wire resistance of the bridge is balanced for minimum indication on the unbalance detector 2. By means of suitable electronic amplification, variations in specific conductance may be readily detected which correspond to variations in acid concentration of the order of 0.01% $H_2SO_4$ by weight.

Readings from the variable resistance of the Wheatstone bridge may be made in terms of ohms of resistance, in terms of an arbitrary scale, or preferably directly in terms of per cent $H_2SO_4$. Calibration of the cell for any specific temperature and any specific amount of carbonaceous material can be made in terms of titratable acidity obtained by actually titrating the black acid at various concentrations.

Connections from the variable resistance of the Wheatstone bridge may be made to a conventional control mechanism, in order to obtain automatic control of acid concentration within an acid treating or acid manufacturing process at any desirable point. For example, in a black acid concentration unit wherein weak acid, previously separated and purified, is charged to an absorber tower for concentration by means of sulfur trioxide absorption, a control valve placed in the weak acid charging line is actuated by the Wheatstone bridge which is in turn connected to a conductivity cell placed in the concentrated acid outlet line leaving the absorber tower. Thus, variations in concentration of acid product are immediately transmitted to the control valve which opens or closes in order to maintain an inlet flow of weak acid as necessary to produce a concentrated acid of any desired strength.

When selecting an electrode to be used in a conductivity cell in accordance with this invention, consideration should be given to the possible corrosive effect of the black acid on the metal selected. With acids of relatively high concentration, such as 90 per cent or higher, corrosion is ordinarily negligible. However for acids of weaker concentration, such as 30 per cent or less, the use of iron or any other metal displacing hydrogen from sulfuric acid at such concentration would not be practicable due to corrosion. From these considerations, the selection of any particular metal electrode for use with any range of acid concentration will be apparent to those skilled in the art.

It is known that the concentration-specific conductance curve for sulfuric acid follows a complete reversal of slope at approximately 30 per cent, 93 per cent and 100 per cent $H_2SO_4$. Therefore, in the vicinity of these percentages, one specific conductance may correspond to two differing concentrations of sulfuric acid. However, these percentages are rarely found in commercial manufacturing processes, and, if the approximate range of concentration of acid is known no difficulty is encountered in the process of this invention unless the concentration actually passes through the percentages mentioned. In that event, it is necessary to determine which of the two possible concentrations is being measured by determining the concentration by other known methods.

In order to determine the accuracy of concentration measurements made in accordance with this invention, sixty-five samples were taken at hourly intervals from a unit producing black acid and the sulfuric acid concentration was determined in accordance with this invention. Conventional laboratory titrations were also made on each sample. The maximum arithmetic deviation between the results from the electrical methods of this invention and results by titration was 0.3% $H_2SO_4$, and the average arithmetic deviation on all samples was 0.024% $H_2SO_4$.

The method of this invention may be employed in any case where it is desired to determine by a conductance method the concentration of sulfuric acid which is contaminated with carbonaceous impurities; that is, black acid. The concentration of the acid may be determined by the method of this invention at any desired stage of any specified hydrocarbon treatment process employing sulfuric acid. The method of this invention may also be used in the purification and concentration of black acid as a means of determining the desired degree of concentration.

It may be seen that the determination of sulfuric acid concentration in black acid in accordance with this invention offers many advantages over prior art practices. Measurements may be made quickly and efficiently and with an accuracy heretofore attained only by the relatively slow and cumbersome method of titration with standardized alkaline solutions. For plant control purposes, this is an important advantage since the need for skilled operators and delicate equipment is obviated. Furthermore, continuous accurate determinations, resulting from nonpolarization of the electrodes, enables closer process control than could be heretofore achieved.

What I claim is:

1. In the determination of the concentration of sulfuric acid in black acid by measurement of the specific conductance thereof, the process which comprises determining said specific conductance between metal electrodes selected from the group consisting of the noble metals, iron, copper and tungsten in direct contact with said black acid and having no depolarizing film thereon at a minimum frequency of 400 cycles per second of alternating current and at a substantially constant temperature.

2. In the determination of the concentration of sulfuric acid in black acid by measurement of the specific conductance thereof, the process which comprises determining said specific conductance between platinum electrodes in direct contact with said black acid and having no depolarizing film thereon at a minimum frequency of 400 cycles per second of alternating current and at a substantially constant temperature.

3. In the determination of the concentration of sulfuric acid in black acid by measurement of the specific conductance thereof, the process which comprises determining said specific conductance between copper electrodes in direct contact with said black acid and having no depolarizing film thereon at a minimum frequency of 400 cycles per second of alternating current and at a substantially constant temperature.

4. In the determination of the concentration of sulfuric acid in black acid by measurement of the specific conductance thereof, the process which comprises determining said specific conductance between tungsten electrodes in direct contact with said black acid and having no depolarizing film thereon at a minimum frequency of 400 cycles per second of alternating current and at a substantially constant temperature.

ROBERT ELMO PRICE.

REFERENCES CITED

The following references are of record in the file of this patent:

UNITED STATES PATENTS

| Number | Name | Date |
|---|---|---|
| 1,379,266 | Keeler | May 24, 1921 |
| 1,472,125 | Keeler | Oct. 30, 1923 |
| 1,870,995 | Greer | Aug. 9, 1932 |
| 2,395,425 | Osborne | Feb. 26, 1946 |

OTHER REFERENCES

Journal Am. Chem. Soc., vol. 42, 1920, pages 1648–1655, article by Eastman.

Journal Am. Chem. Soc., vol. 44, 1922, page 2508, article by Willard.